US011357163B2

(12) United States Patent
Frank et al.

(10) Patent No.: US 11,357,163 B2
(45) Date of Patent: Jun. 14, 2022

(54) CONTROL SYSTEM FOR AIR SEEDER VENTING SYSTEM

(71) Applicant: Precision Planting LLC, Tremont, IL (US)

(72) Inventors: William Frank, Manito, IL (US); Chad E. Plattner, Tremont, IL (US); Trenton Noreen, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 336 days.

(21) Appl. No.: 16/609,849

(22) PCT Filed: Apr. 27, 2018

(86) PCT No.: PCT/US2018/029913
§ 371 (c)(1),
(2) Date: Oct. 31, 2019

(87) PCT Pub. No.: WO2018/204196
PCT Pub. Date: Nov. 8, 2018

(65) Prior Publication Data
US 2020/0068788 A1    Mar. 5, 2020

Related U.S. Application Data

(60) Provisional application No. 62/502,432, filed on May 5, 2017.

(51) Int. Cl.
*A01C 7/08*    (2006.01)
*A01C 7/10*    (2006.01)

(52) U.S. Cl.
CPC .............. *A01C 7/081* (2013.01); *A01C 7/105* (2013.01)

(58) Field of Classification Search
CPC ........... A01C 7/081; A01C 7/105; A01C 7/08; A01C 7/00; A01C 7/102; A01C 7/10
See application file for complete search history.

(56) References Cited

U.S. PATENT DOCUMENTS

| | | | |
|---|---|---|---|
| 3,710,651 A * | 1/1973 | Marumo ............ G05D 16/2097 | |
| | | | 477/160 |
| 5,831,539 A | 11/1998 | Thomas et al. | |
| 5,923,262 A | 7/1999 | Fuss et al. | |
| 5,996,516 A | 12/1999 | Benneweis et al. | |
| 6,024,035 A | 2/2000 | Flamme | |
| 6,158,363 A | 12/2000 | Memory et al. | |
| 6,192,813 B1 | 2/2001 | Memory et al. | |
| 6,505,569 B1 | 1/2003 | Richard | |
| 8,684,636 B2 | 4/2014 | Dunstan | |
| 8,955,445 B2 | 2/2015 | Riffel | |

(Continued)

FOREIGN PATENT DOCUMENTS

GB         1 498 742 A     1/1978

OTHER PUBLICATIONS

European Patent Office, Search Report for related European Application No. EP 18 79 4650, dated Jan. 21, 2019.

(Continued)

*Primary Examiner* — Christopher J. Novosad

(57) ABSTRACT

In one embodiment, an air seeder tower includes a valve with an actuator, and a closed loop feedback control with a sensor to control actuation of the valve to control air flow out of the air seeder vent tower.

15 Claims, 7 Drawing Sheets

(56) References Cited

U.S. PATENT DOCUMENTS

| | | |
|---|---|---|
| 9,580,256 B2 | 2/2017 | Wagers et al. |
| 2007/0151363 A1 | 7/2007 | Ramsesh |
| 2009/0165686 A1 | 7/2009 | Memory et al. |
| 2010/0122648 A1 | 5/2010 | Memory |
| 2011/0035163 A1 | 2/2011 | Landphair |
| 2012/0312211 A1 | 12/2012 | Hubalek et al. |
| 2013/0319305 A1 | 12/2013 | Riffel |
| 2014/0263409 A1* | 9/2014 | Wagers .................. A01C 7/102 222/1 |
| 2016/0120103 A1* | 5/2016 | Gervais .................. A01C 7/081 406/10 |
| 2016/0165792 A1 | 6/2016 | Henry |
| 2016/0192581 A1 | 7/2016 | Henry |
| 2017/0086350 A1 | 3/2017 | Borkgren |

OTHER PUBLICATIONS

International Search Authority of US Patent and Trademark Office, International Search Report for International Application No. PCT/US2018/029913, dated Jul. 19, 2018.

John Deere Company, Air Seeder Brochure, Published on JohnDeere.com, Copyright 2015.

Seedvu, How It Works, Published @ www.airseederventingunit.com/how-it-works, Copyright 2013.

Seedvu, Not Just Another Diffuser, Published @ www.airseederventingunit.com/not-just-anotehr-diffuser, Copyright 2013.

John Flood, Ultrasonic Flowmeter Basics, Published @ www.sensorsmag.com, Copyright 2018.

* cited by examiner

CONTROL SYSTEM FOR AIR SEEDER VENTING SYSTEM

RELATED APPLICATIONS

This application claims the benefit of U.S. Provisional Application No. 62/502,432, filed on May 5, 2017 entitled: CONTROL SYSTEM FOR AIR SEEDER VENTING SYSTEM, which is incorporated by reference herein.

TECHNICAL FIELD

Embodiments of the present disclosure relate to a control system for air seeder venting system.

BACKGROUND

Air seeders have a primary distribution system and a secondary distribution system. Seeds and optionally fertilizer are fed from hoppers into the primary distribution system and are conveyed by air to the secondary distribution system. A manifold between the primary distribution system and the secondary distribution system divides the feed so that the secondary distribution system delivers seeds/fertilizer to each row. Seeds/fertilizer are conveyed by air.

To plant more quickly, increased air pressure is used. But with increased pressure, seeds/fertilizer may impact the furrow with too great a force and bounce out. This results in lower yield.

One solution has been to install a diffuser in the tower above the manifold. An example is the SeedVU™ diffuser, which is described in U.S. Pat. No. 8,684,636. This diffuser has an adjustable valve to vent excess air to reduce the pressure in the secondary distribution system. This diffuser is limited by having to be set before planting starts. The diffuser cannot adjust to changing conditions during planting, which can result in too little or too much seed being delivered to each row.

BRIEF DESCRIPTION OF THE DRAWINGS

The present disclosure is illustrated by way of example, and not by way of limitation, in the figures of the accompanying drawings and in which.

BRIEF SUMMARY

A closed loop feedback control system is described herein for an air seeder manifold tower to control venting of air from the air seeder manifold tower.

DETAILED DESCRIPTION

All references cited herein are hereby incorporated by reference in their entireties. However, in the event of a conflict between a definition in the present disclosure and one in a cited reference, the present disclosure controls.

Figure 1:
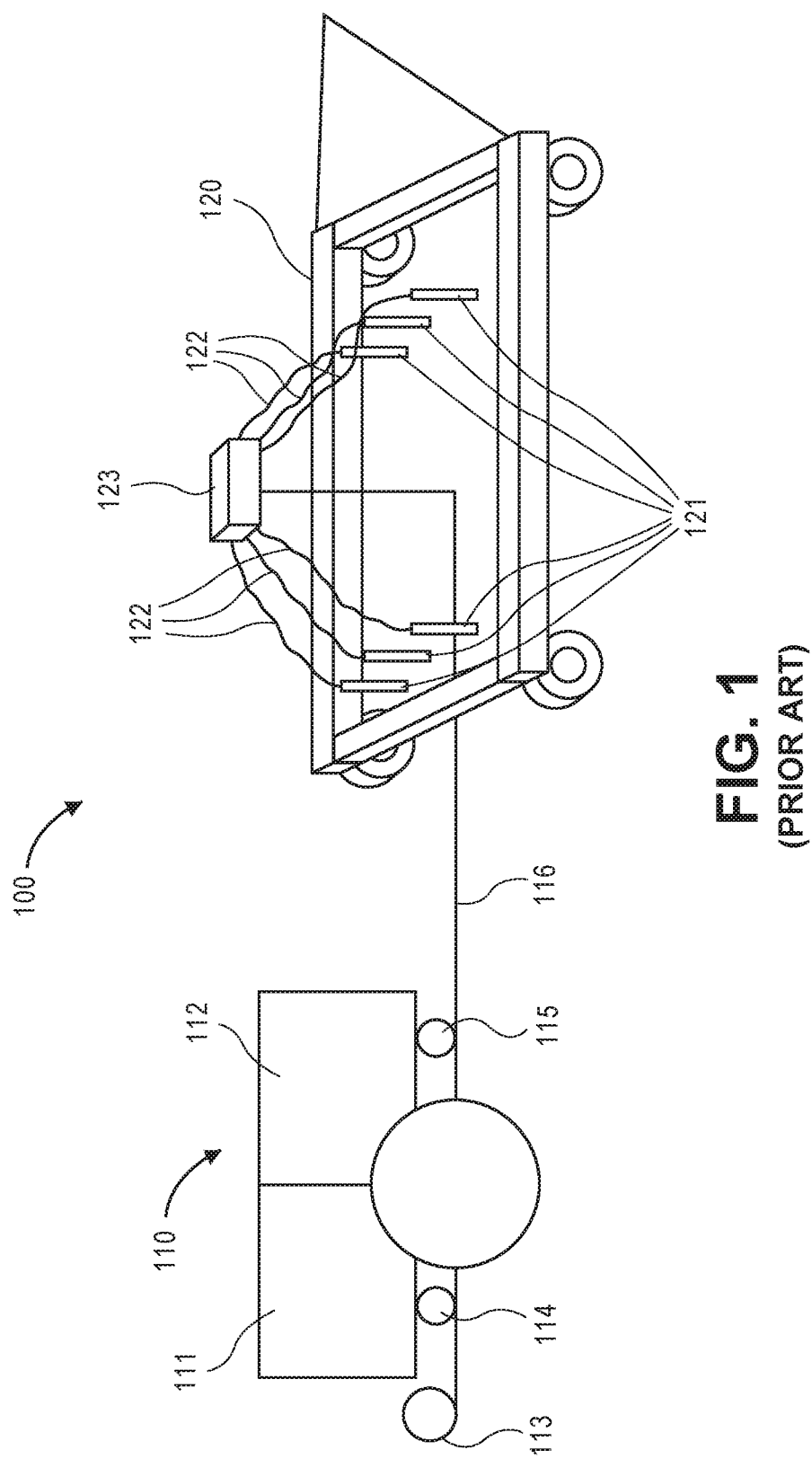
FIG. 1 illustrates a prior art air seeder.

FIG. 1 illustrates a typical air seeder 100. Air seeder 100 includes a cart 110 and frame 120. Cart 110 has hopper 111 and hopper 112 for storing seed and fertilizer, respectively. A main product line 116 is connected to a fan 113 for conveying seed and fertilizer conveyed from meter 114 and meter 115, respectively. Main product line 116 feeds seed and fertilizer to manifold tower 123. Seed and fertilizer are distributed through manifold tower 123 to secondary product lines 122 to openers 121.

While the description below is for control of the manifold tower 123 of one section of an air seeder 100, the same system can be applied to each section.

Figure 2:
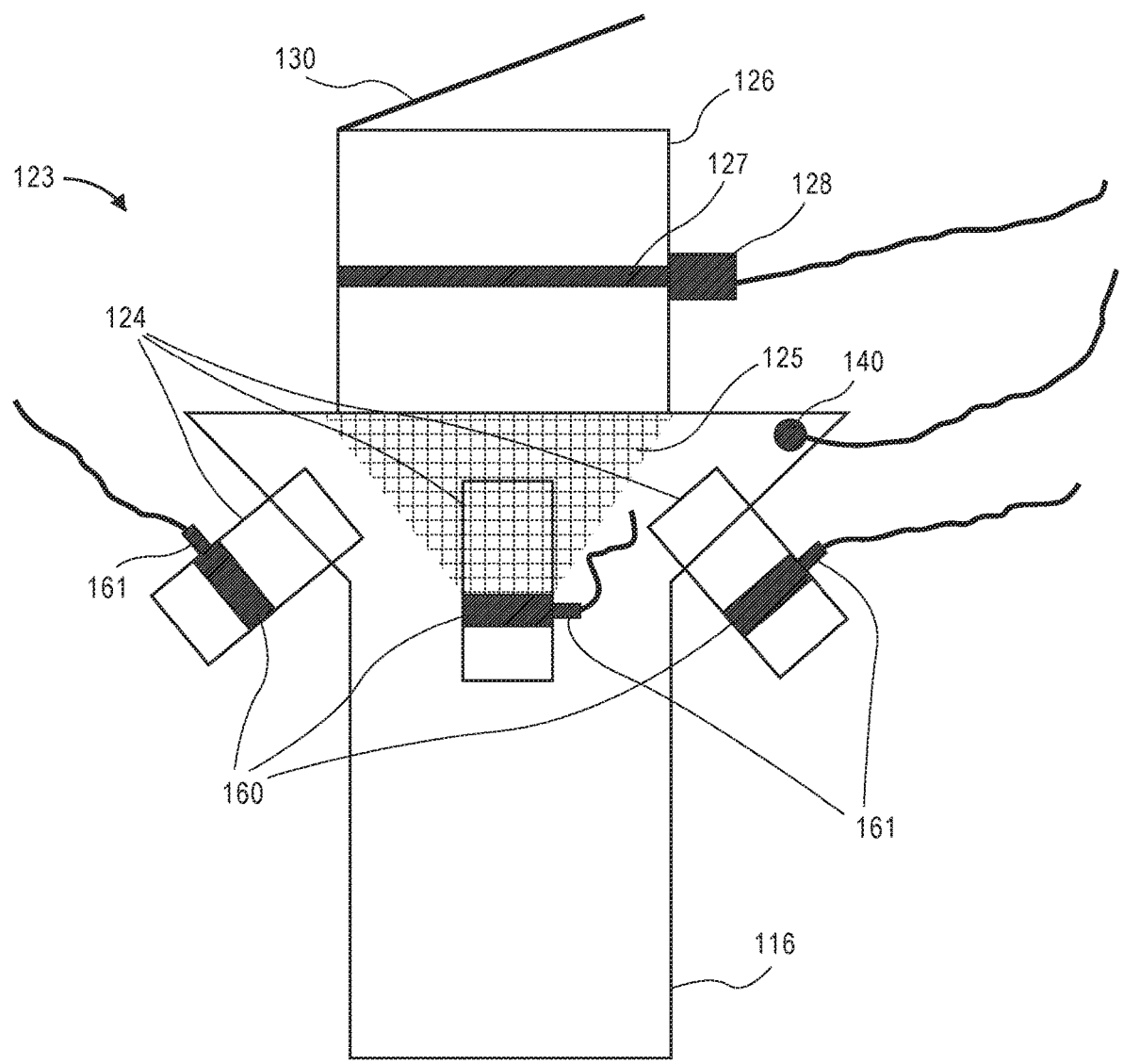
FIG. 2 illustrates an air seeder tower having a vent valve and an actuator for the valve according to one embodiment.

FIG. 2 illustrates manifold tower 123. Manifold tower 123 has main product line 116 providing seed and optionally fertilizer in a flow of air. Seed/fertilizer impact screen 125, which has a mesh size to prevent passage of seed and/or fertilizer. Seeds/fertilizer fall into outlets 124 (or exit ports) and feed into secondary product lines 122. Above screen 125 is a tower 126 which contains a valve 127. Valve 127 can be any type of valve that can be actuated. In one embodiment, valve 127 is a butterfly valve. Valve 127 is actuated by actuator 128, which is disposed on tower 126. Actuator 128 is in signal contact with electrical control system 300. Optionally, a lid 130 is pivotably attached to tower 126 to cover tower 126 when no air is flowing. When air is flowing, lid 130 raises by the force of air flowing through tower 126, and when air is not flowing, lid 130 closes tower 126.

In one embodiment, which is illustrated in FIG. 2, manifold tower 123 further includes a pressure sensor 140 disposed in the manifold tower 123. In another embodiment, pressure sensor 140 is disposed in at least one secondary product line 122. Pressure sensor 140 is in signal communication with electrical control system 300. This can provide a closed loop feedback control of valve 127. In another embodiment, electrical control system 300 measures the pressure at pressure sensor 140 in the manifold tower 123 and the pressure sensor 140 in the secondary product line 122 and calculates a difference between each pressure sensor. Electrical control system 300 can control based on the pressure difference.

Figure 3:
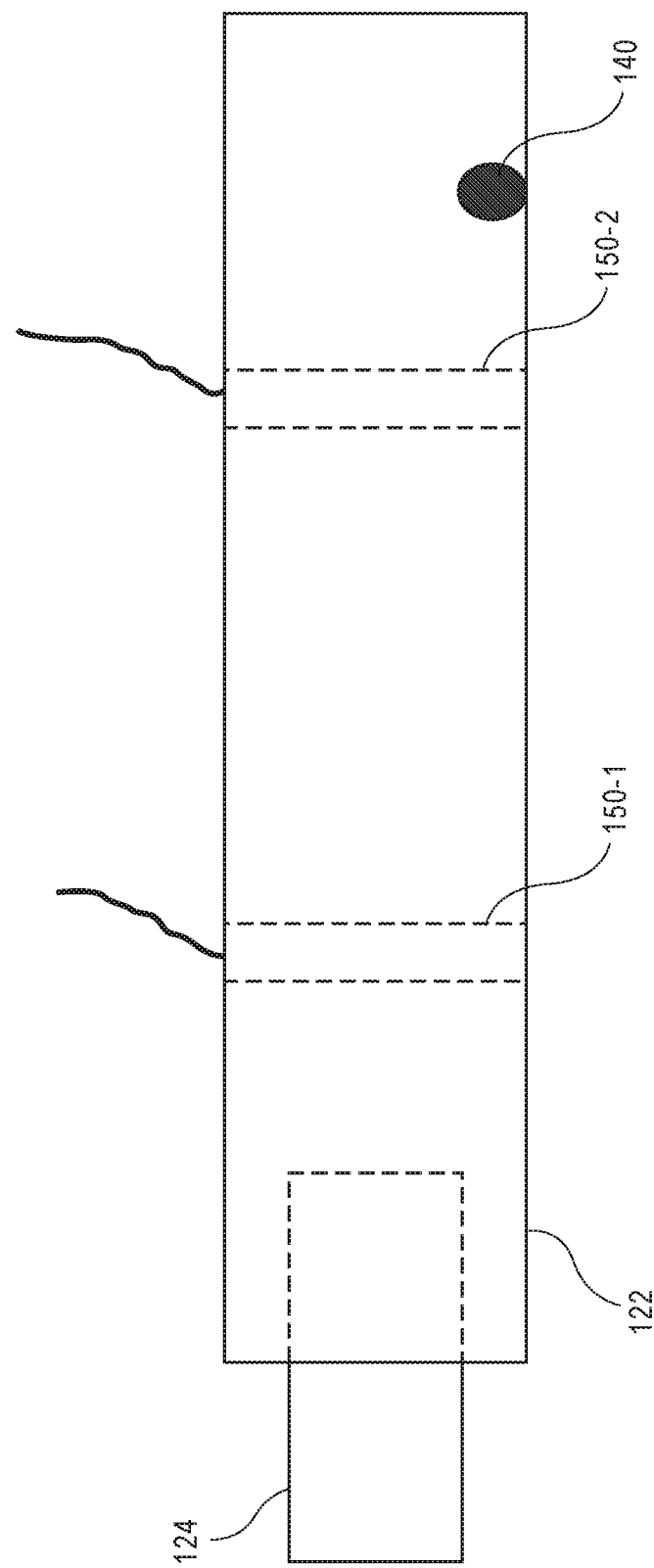
FIG. 3 illustrates a secondary product line having flow sensors according to one embodiment.

In another embodiment, which is illustrated in FIG. 3, there are a first particle sensor 150-1 and a second particle sensor 150-2 disposed serially within at least one secondary product line 122. First particle sensor 150-1 and second particle sensor 150-2 can be disposed individually or as parts within one unit. First particle sensor 150-1 and second particle sensor 150-2 are spaced at a distance such that a waveform measured at the first particle sensor 150-1 will be duplicated at the second particle sensor 150-2. As seeds travel through an air seeder, they will not flow in a uniform distribution all of the time. In a selected cross section, there can be one, two, three, four, five, or more seeds together. As the seeds travel over a distance, the distribution of seeds in each grouping can expand or condense. Over a short distance, the grouping will remain uniform. Each grouping of seeds will generate a different waveform in a particle sensor. The waveforms from a plurality of groupings will create a pattern in the first particle sensor 150-1. When this pattern is then detected at the second particle sensor 150-2, the time difference between each of these measurements is then divided by the distance between first particle sensor 150-1 and second particle sensor 150-2 to determine the speed of seeds/fertilizer in the secondary product line 122. Using the speed, electronic control system 300 can actuate actuator 128 to change the amount of air exiting tower 126 to change the speed of seed/fertilizer in the secondary product line 122.

An example of a particle sensor is Wavevision Sensor from Precision Planting LLC, and which is described in U.S. Pat. No. 6,208,255. First particle sensor 150-1 and second particle sensor 150-2 are in signal communication with electrical control system 300. This can provide a closed loop feedback control of valve 127.

While both the pressure sensor 140 and the particle sensors 150-1, 150-2 are illustrated, only one is needed for the closed loop feedback control.

Figure 7:
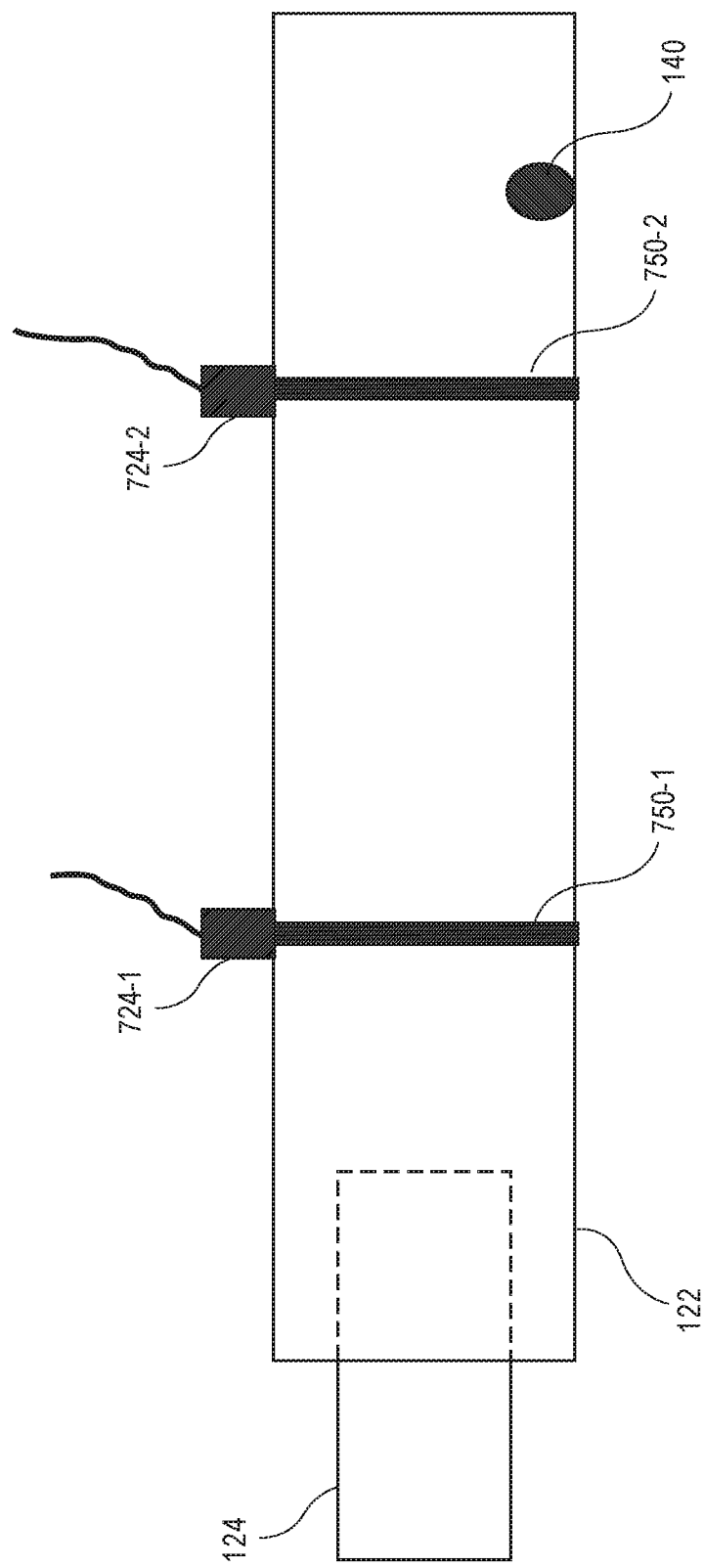
FIG. 7 illustrates a secondary product line 122 that contains at least one valve (e.g., 750-1, 750-2) and at least one corresponding actuator (e.g., 724-1, 724-2) in accordance with one embodiment.

In another embodiment that is illustrated in FIG. 2, there can be at least one valve (e.g., valve 160) disposed in each outlet 124 (or exit port) and actuated by actuator 161, which is in signal communication with electrical control system 300. Each actuator 161 (or actuators) can be individually controlled to further regulate flow with at least one valve in each secondary product line 122. Each secondary product line 122 can contain at least one valve (e.g., 750-1, 750-2) and corresponding actuator (e.g., 724-1, 724-2) as illustrated in FIG. 7. This can provide fine-tuned control in each secondary product line 122 separate from other secondary product lines 122. The pressure sensor 140, an ultrasonic speed sensor, or particle sensors 150-1, 150-2 in each secondary product line 122 can provide the measurement for controlling each actuator 122.

Electrical Control System

Figure 4:
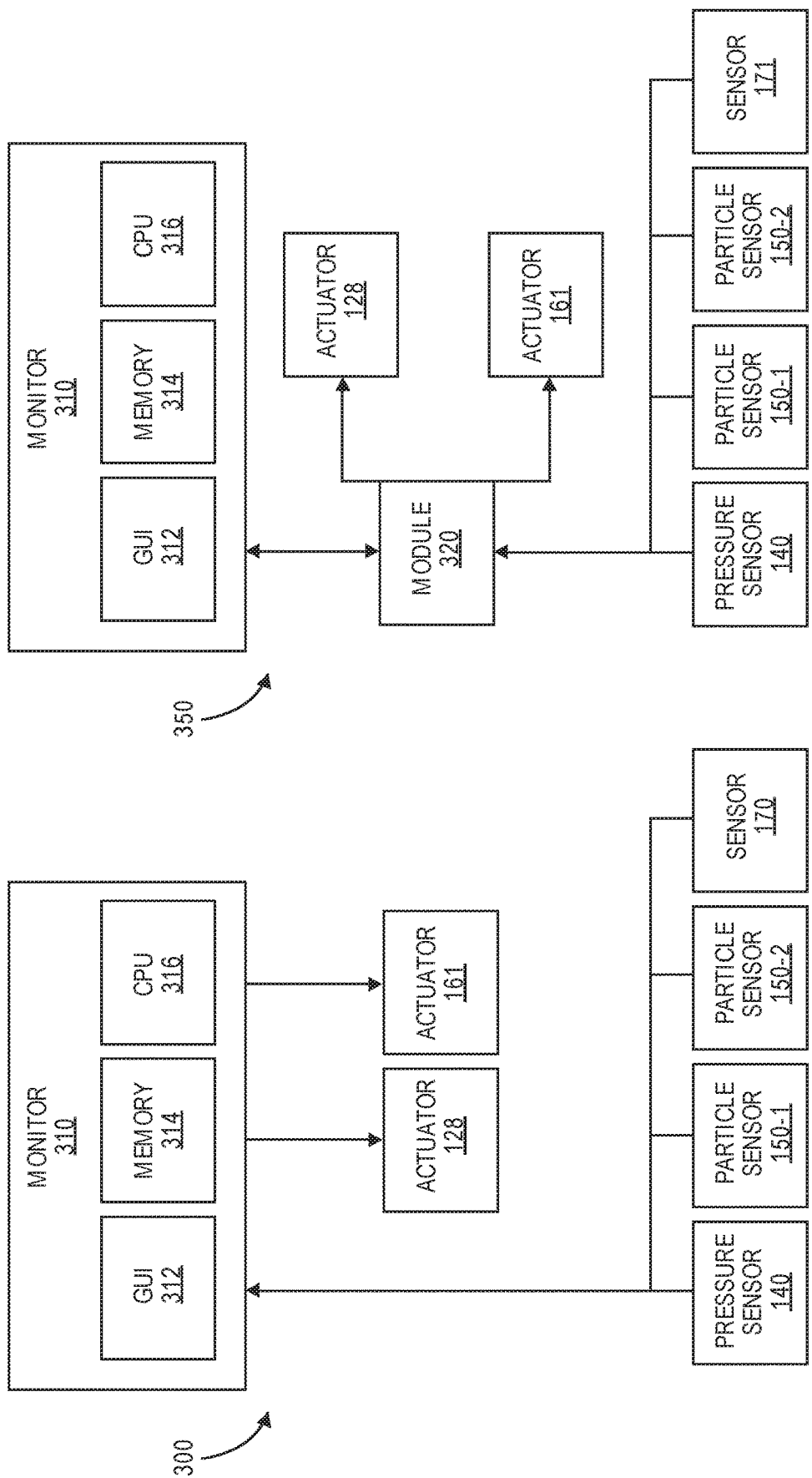
FIG. 4A schematically illustrates an embodiment of an electrical control system for controlling an actuator.
FIG. 4B schematically illustrates an embodiment of an electrical control system for controlling an actuator.

Electrical control system 300 is illustrated schematically in FIG. 4A in accordance with one embodiment. In the electrical control system 300, the monitor 310 is in signal communication with actuator 128, actuator 161, pressure sensor 140, fluid velocity sensor 170, and particle sensors 150-1, 150-2. It should be appreciated that the monitor 310 comprises an electrical controller. Monitor 310 includes a central processing unit (CPU) 316, a memory 314, and optionally a graphical user interface (GUI) 312, which allows a user to view and enter data into the monitor 310. The monitor 310 can be of a type disclosed in U.S. Pat. No. 8,386,137. For example, monitor 310 can be a planter monitor system that includes a visual display and user interface, preferably a touch screen graphic user interface (GUI). The touchscreen GUI is preferably supported within a housing which also houses a microprocessor, memory and other applicable hard ware and software for receiving, storing, processing, communicating, displaying and performing various features and functions. The planter monitor system preferably cooperates and/or interfaces with various external devices and sensors.

An alternative electrical control system 350 is illustrated in FIG. 4B, which includes a module 320. Module 320 receives signals from pressure sensor 140, fluid velocity sensor 171, and particle sensors 150-1, 150-2, which can be provided to monitor 310 to output on GUI 312. Module 320 can also provide control signals to actuator 128 and actuator 161, which can be based on operator input into monitor 310.

Operation

In operation of the closed loop feedback control, monitor 310 receives a signal from the pressure sensor, fluid velocity sensor, and/or particle sensors 150-1, 150-2. The monitor 310 uses the pressure signal, fluid velocity signal, and/or the particle signal to set a selected position of actuator 128 to control valve 127 to regulate the amount of air leaving tower 126. Monitor 310 sends a signal to actuator 128 to effect this change. This in turn controls the amount of air flow in secondary product lines 122 to convey seeds/fertilizer to the trench with the appropriate force and/or speed to place the seeds/fertilizer in the trench without having the seeds/fertilizer bounce out of the trench.

In addition to measuring pressure or the velocity of the particle, the velocity of the fluid (air) can be measured. An ultrasonic speed sensor can measure fluid velocity.

Figure 5:
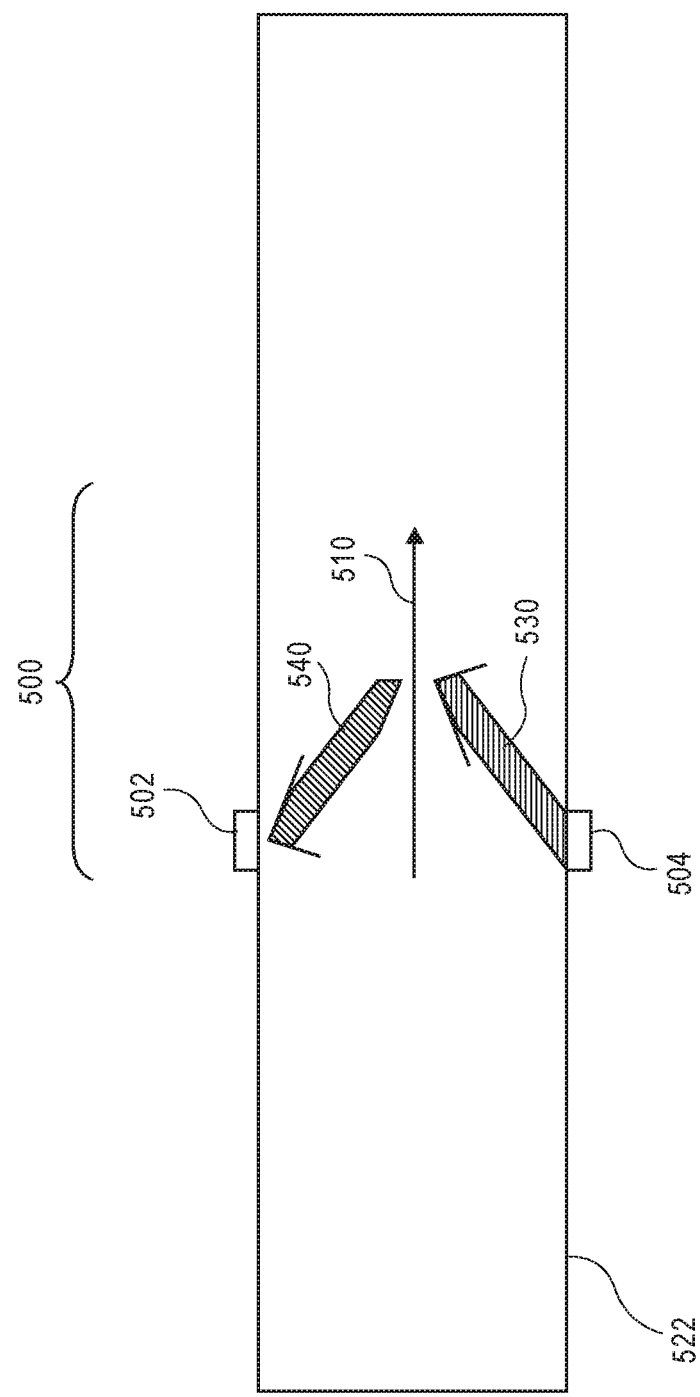
FIG. 5 illustrates a secondary product line having an ultrasonic sensor according to one embodiment.

FIG. 5 illustrates an ultrasonic sensor for detecting flow through a product line or pipe in accordance with one embodiment. The ultrasonic sensor 500 is positioned on a line 522 (e.g., secondary product line) or pipe 522 or in close proximity to the line 522 or pipe 522. The sensor (or ultrasonic flowmeter) uses acoustic waves or vibrations of a certain frequency (e.g., greater than 20 kHz, approximately 0.5 MHz). The sensor 500 uses either wetted or nonwetted transducers on the line or pipe perimeter to couple ultrasonic energy with the fluid flowing in the line or pipe. In one example, the sensor operates with the Doppler effect in which a transducer 504 having a transmitter transmits a beam 530. A transmitted frequency of the beam 530 is altered linearly by being reflected from particles and bubbles with a fluid that is within the line 522 to generate a Doppler reflection 540 that is received by a receiver of a transducer 502. A frequency shift between a frequency of the beam 530 and a frequency of the reflection 540 can be directly related to a flow rate of a fluid (e.g., liquid, air) having a flow direction 510. The frequency shift is linearly proportional to the rate of flow of materials in the line or pipe and can be used to generate an analog or digital signal that is proportional to flow rate of the fluid. With an inside diameter (D) of a line 522 or pipe 522 being known, a volumetric flow rate (e.g., gallons per minute) equals $K*Vf*D_2$. In this example, Vf is flow velocity and K is a constant dependent on units of Vf and D.

Figure 6:
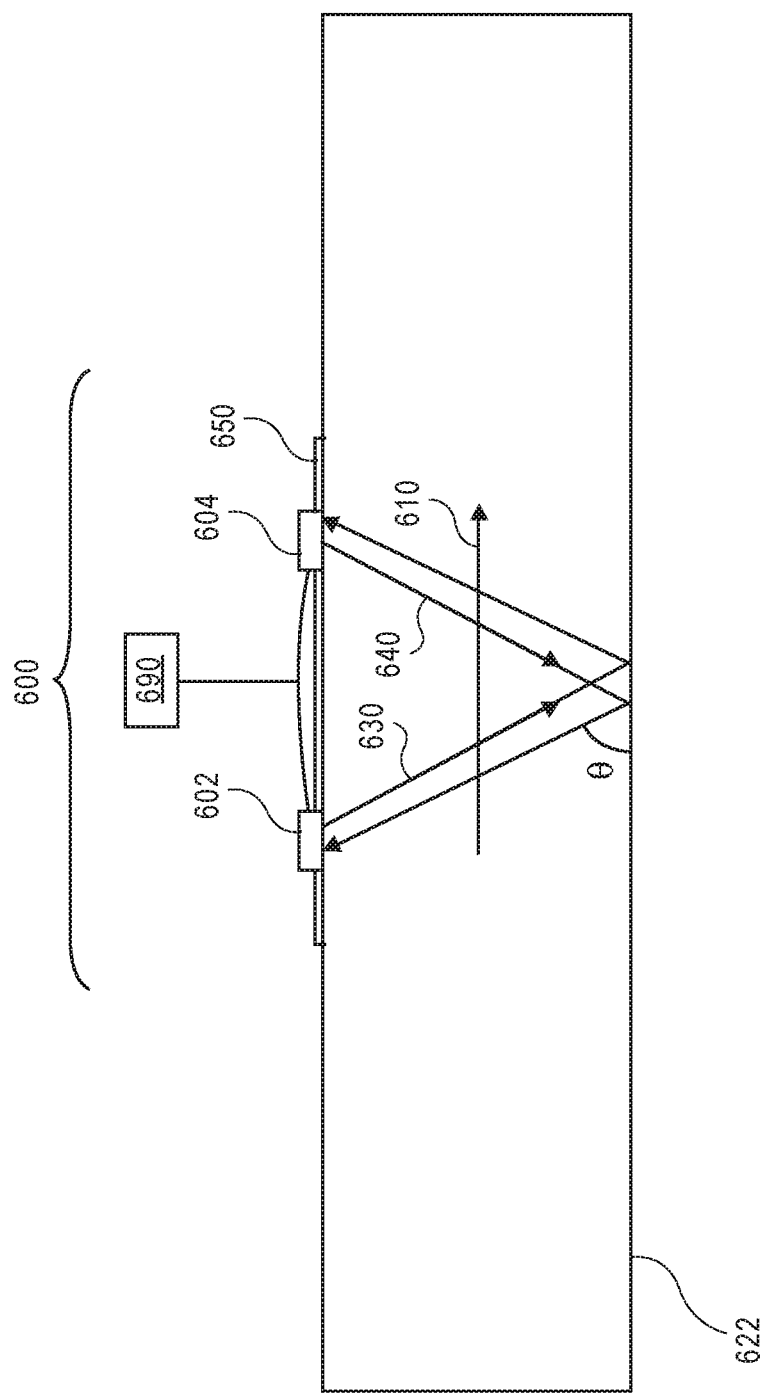
FIG. 6 illustrates a secondary product line having an ultrasonic sensor according to another embodiment.

FIG. 6 illustrates an ultrasonic sensor (e.g., transit-time flowmeter) for detecting flow through a product line or pipe in accordance with one embodiment. Transit-time flowmeters (e.g., time of flight flowmeter, time of travel flowmeter) measure a difference in travel time between pulses transmitted in a single path along and against a flow of fluid (e.g., liquid, air). The sensor 600 has a case 650 with transducers 602 and 604. The sensor 600 is positioned on a line 622 (e.g., secondary product line) or pipe 622 or in close proximity to the line 622 or pipe 522.

In one example as illustrated in FIG. 6, the sensor operates with transducers 602 and 604. Each transducer having a transmitter and a receiver alternately transmits and receives bursts of ultrasonic energy as beams 630 and 640 at an angle theta (e.g., approximately 45 degrees). A difference in transit times in upstream versus downstream directions (Tu-Td) measured over a same path can be used to calculate a flow through the line or pipe:

$$V = K*D/\sin 2\theta * 1/(T0-\tau)^2 \, \delta T$$

V is a mean velocity of flowing fluid, K is a constant, D is a diameter of the line or pipe, theta is an incident angle of ultrasonic burst waves, T0 is zero flow transit time, delta T is T2-T1, T1 is transit time of burst waves (beam 630) from transducer 602 to transducer 604, T2 is transit time of burst waves (beam 640) from transducer 604 to transducer 602, and tau is transmit time of burst waves through the line 622 or pipe. The flow velocity is directly proportional to a measured different between upstream and downstream transit times. A measure of volumetric flow is determined by multiplying a cross-section area of the line or pipe with flow velocity. The volumetric flow can be determined with an optional micro-processor based converter 690 or the electrical control system 300 or 350. The fluid having a flow path 610 needs to be a reasonable conductor of sonic energy.

What is claimed is:

1. An air seeder comprising:
   a main product supply line connected to a manifold tower having a plurality of exit ports, each exit port connected to a secondary product line;
   a vent tower disposed above the manifold tower and having a vent valve disposed therein;
   a controller;
   an actuator connected to the vent valve for actuating the vent valve and in signal communication with the controller; and
   a sensor for measuring at least one of pressure, fluid velocity, and a particle and in signal communication with the controller.

2. The air seeder of claim 1, wherein the sensor is a pressure sensor disposed in the manifold tower.

3. The air seeder of claim 1, wherein the sensor is a pressure sensor disposed in at least one secondary product line.

4. The air seeder of claim 1, wherein the sensor comprises a first particle sensor and a second particle sensor disposed in series in at least one secondary product line.

5. The air seeder of claim 1, wherein the sensor comprises an ultrasonic sensor disposed in at least one secondary product line to measure fluid flow.

6. The air seeder of claim 1, wherein each exit port further comprises a valve disposed in the exit port with an actuator connected to the valve for actuating the valve and in signal communication with the controller.

7. The air seeder of claim 1, wherein at least one secondary product line further comprises a valve disposed in the at least one secondary product line with an actuator connected to the valve for actuating the valve and in signal communication with the controller.

8. The air seeder of claim 1, wherein at least one secondary product line further comprises a plurality of valves disposed in the at least one secondary product line with at least one actuator connected to the plurality of valves for actuating the plurality of valves and in signal communication with the controller.

9. The air seeder of claim 1, wherein the main product line is configured to provide at least one of seed and fertilizer in a flow of air to the manifold tower.

10. An air seeder comprising:
    a manifold tower having a vent valve and a plurality of exit ports, each exit port connected to a secondary supply line;
    a controller;
    a vent valve actuator connected to the vent valve for actuating the vent valve and in signal communication with the controller; and
    a sensor for measuring at least one of pressure, fluid velocity, and a particle and in signal communication with the controller;
    wherein each exit port further comprises an exit valve disposed in the exit port with an exit valve actuator connected to the exit valve for actuating the exit valve and in signal communication with the controller.

11. The air seeder of claim 10, wherein the sensor is a pressure sensor disposed in at least one secondary supply line.

12. The air seeder of claim 10, wherein the sensor comprises a first particle sensor and a second particle sensor disposed in series in at least one secondary supply line.

13. The air seeder of claim 10, wherein the sensor comprises an ultrasonic sensor disposed in at least one secondary supply line to measure fluid flow.

14. The air seeder of claim 10, wherein the controller is configured to perform closed loop feedback control of fluid flow.

15. The air seeder of claim 14, wherein the controller is configured to receive a signal from the at least one sensor, to use the signal to set a selected position of the vent valve actuator to control the vent valve to regulate an amount of air leaving the manifold tower in order to control the amount of air flow in secondary supply lines to convey at least one of seeds and fertilizer to a trench within a field with a selected force and speed to place at least one of the seeds and fertilizer in the trench.

* * * * *